(12) United States Patent
Naito et al.

(10) Patent No.: US 6,647,475 B2
(45) Date of Patent: Nov. 11, 2003

(54) PROCESSOR CAPABLE OF ENABLING/ DISABLING MEMORY ACCESS

(75) Inventors: Mutsuhiro Naito, Kawasaki (JP); Kazuaki Mizoguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 235 days.

(21) Appl. No.: 09/791,874

(22) Filed: Feb. 26, 2001

(65) Prior Publication Data

US 2002/0026567 A1 Feb. 28, 2002

(30) Foreign Application Priority Data

Aug. 25, 2000 (JP) ........................................ 2000-255318

(51) Int. Cl.[7] .............................................. G06F 12/00
(52) U.S. Cl. ............................ 711/163; 711/5; 711/201
(58) Field of Search ................................. 711/163, 201, 711/5

(56) References Cited

FOREIGN PATENT DOCUMENTS

| JP | 5-100847 | 4/1993 |
|----|----------|--------|
| JP | 09293020 | * 11/1997 |

* cited by examiner

*Primary Examiner*—Jack A. Lane
(74) *Attorney, Agent, or Firm*—Staas & Halsey LLP

(57) ABSTRACT

A low-end microprocessor 10 includes a stack pointer 18 storing a word SPV, a comparator 17 comparing the SPV with a given value ADR1, an inverter 19 inverting the compared result CP, and an AND gate 16 receiving a write request signal WR from a CPU 11 and the output of the inverter 19. The AND gate 16 provides its output to the write enable signal input WE of a memory 12 in order to determine enabling/disabling of writing according to the depth of stack.

13 Claims, 6 Drawing Sheets

PROCESSOR CAPABLE OF ENABLING/DISABLING MEMORY ACCESS

BACKGROUND OF THE INVENTION

1. Field of the Invention

The present invention relates generally to a processor capable of enabling/disabling memory access, more particularly, to a low-end microprocessor capable of disabling memory access for a protection area during an application program being running.

2. Description of the Related Art

In electronic equipment such as a portable telephone, a low-end microprocessor is utilized. For example, there can be a case where data set by a user is rewritten against his will when a program downloaded to a portable telephone from a web site (hereinafter referred to as an application program) is executed. When a high-end microprocessor is utilized, it is possible to keep data from destruction by an application program if attaching a level to a memory access right or an executive instruction with placing a main program, an OS for example, at a privilege level.

However, when a low-end microprocessor is substituted for a high-end microprocessor, not only does it result in high cost, but it is also required to reconstruct soft wares including an OS which have been developed from the start and modify a hardware system. Furthermore, a storage capacity for an OS becomes enormous.

SUMMARY OF THE INVENTION

Accordingly, it is an object of the present invention to provide a processor capable of enabling/disabling memory access by adding a simple hardware configuration thereto.

In one aspect of the present invention, there is provided a processor comprising: a stack pointer; and an access enable/disable determining circuit, comparing the contents of the stack pointer with a given value to provide a signal enabling/disabling memory access according to the comparison result.

With this configuration, since memory access is enabled or disabled according the depth of stack, for example, by doing such that a stack pointer value is smaller than the given value when the main program stored in advance is running while the stack pointer value is equal to the given value when the application program added by user's operation is running, a user can access data during the main program running while unable to access data when the application program is running.

Other aspects, objects, and the advantages of the present invention will become apparent from the following detailed description taken in connection with the accompanying drawings.

DESCRIPTION OF THE PREFERRED EMBODIMENTS

Figure 1:
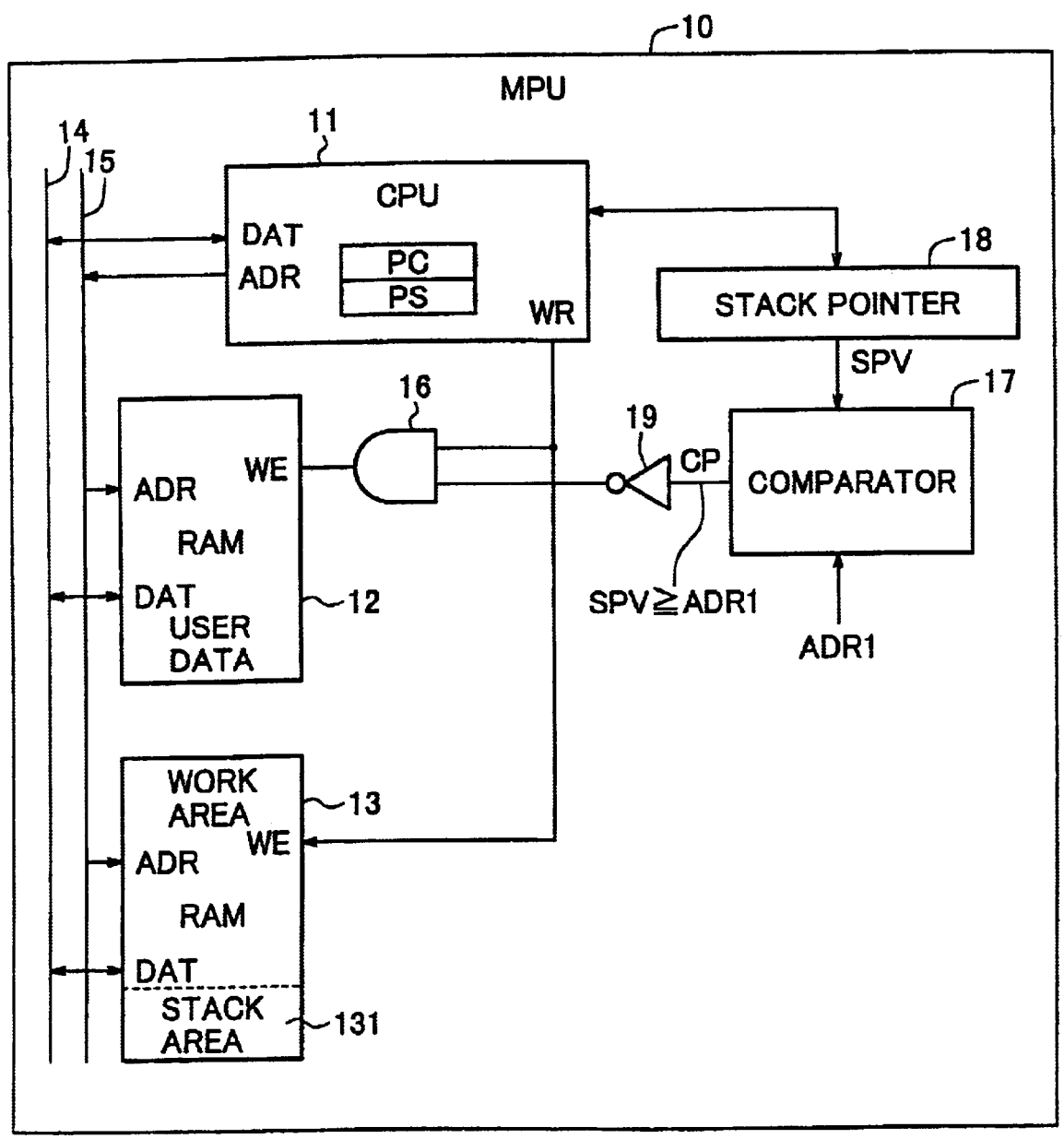
FIG. 1 is a schematic block diagram of a microprocessor of a first embodiment according to the present invention.

Referring now to the drawings, wherein like reference characters designate like or corresponding parts throughout several views, preferred embodiments of the present invention are described below.

First Embodiment

FIG. 1 is a schematic block diagram of a microprocessor 10 of a first embodiment according to the present invention.

The microprocessor 10 is of a low-end. For example, the microprocessor 10 has a data bus width of 16 bits and an address bus width of 32 bits, and is employed in a portable telephone.

A CPU 11 includes an operation circuit, a register file and a control circuit, and performs various operations and controls. The microprocessor includes RAMs 12 and 13. The CPU 11 and the RAMs 12 and 13 are connected through a data bus 14 and an address bus 15. For example, when the most significant bit of an address ADR is '1,' the RAM 12 is in an enable state while the RAM 13 is in a disable state, and when the most significant bit of the address ADR is '0,' the RAM 12 is in a disable state while the RAM 13 is in an enable state.

The CPU 11 provides a write request signal WR and causes it to be high when performing a write into the RAM 12 or 13. The write request signal WR is provided to a first input of an AND gate 16 and the write enable signal input WE of the RAM 13. The output of the AND gate 16 is connected to the write enable signal input WE of the RAM 12.

The CPU 11 includes a program counter PC and a program status register PS. Although the CPU 11 includes a stack pointer 18 as a register in the register file, the stack pointer 18 is depicted outside the CPU 11 for the sake of convenience in FIG. 1, and this applies to other figures.

When the CPU 11 executes an interruption handling routine or a subroutine, as a preprocessing, the CPU 11 save the contents of the program counter PC into a stack area 131 at an address which is specified by the contents SPV of the stack pointer 18, increments the contents SPV of the stack pointer 18 by one, likewise, saves the contents of the program status register PS into the stack area 131 at an address which is specified by the contents SPV of the stack pointer 18, and increments the contents SPV of the stack pointer 18 by one.

When the process returns into the original program from an interruption handling routine or a subroutine, as a post-processing, the CPU 11 performs the reverse of the above described procedure, that is, the CPU 11 decrements the contents SPV of the stack pointer 18 by one, pops data from the stack area 131 at an address which is specified by the contents SPV of the stack pointer 18 into the program status register PS, and likewise, decrements the contents SPV of the stack pointer 18 by one, and pops data from the stack area 131 at an address which is specified by the contents SPV of the stack pointer 18 into the program counter PC.

A comparator 17 compares the stack pointer value SPV with a given address value AVD1, and if SPV≧ADR1, then it sets a comparison result CP at a high, or else at a low. The comparison result CP is provided to the second input of the AND gate 16 via an inverter 19.

In the RAM 12, written are data such as a mode and a telephone number set by a user. The RAM 13 consists of the stack area 131 and a work area.

Figure 2:
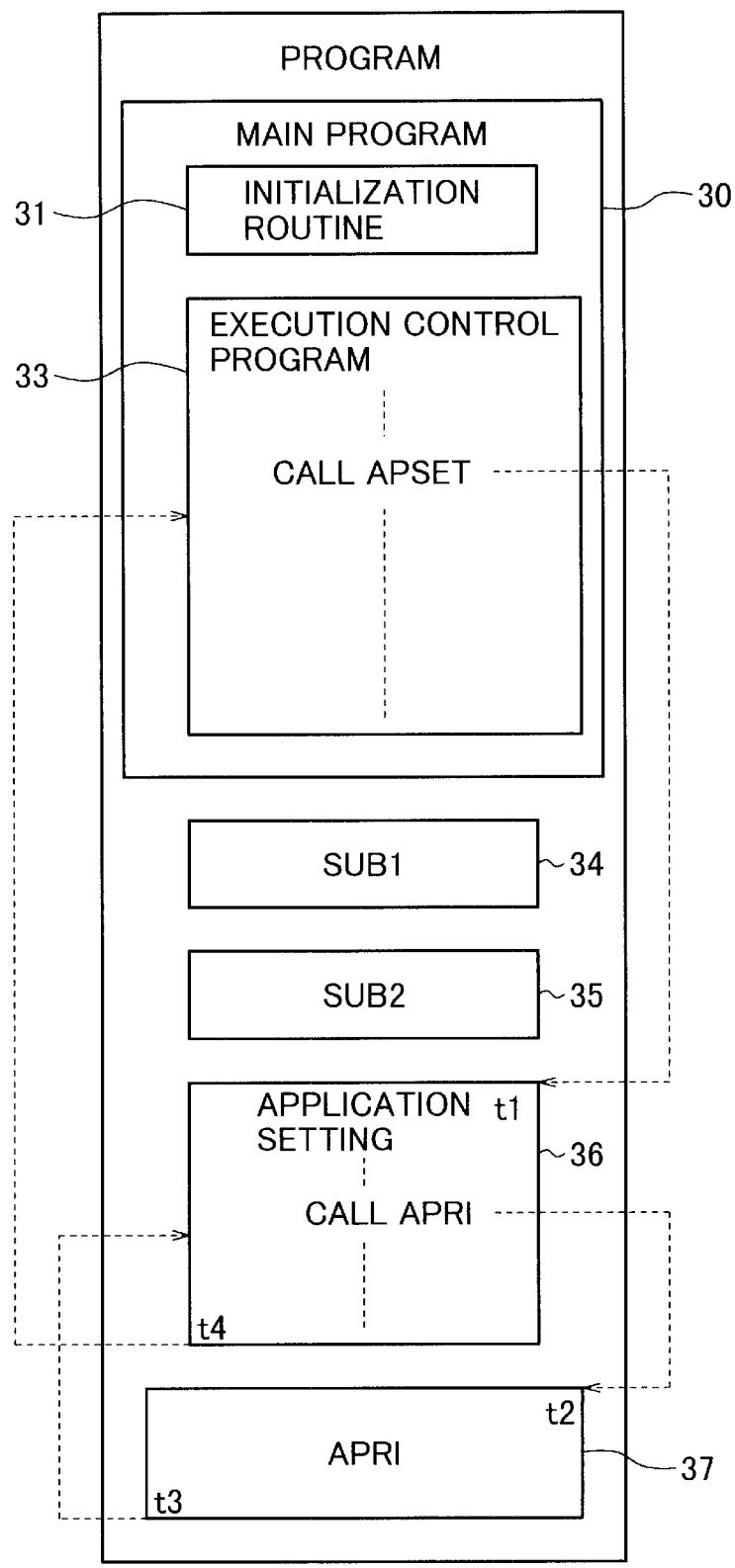
FIG. 2 is a schematic illustration of a program stored in the microprocessor of FIG. 1.

In a program memory (not shown) within the microprocessor 10A, there is stored a program as shown in FIG. 2 for example. A main program 30 includes an initialization routine 31, and an execution control program 33 processing according to input information. Subroutines 34 and 35 can be utilized in any routine. An application setting routine 36 performs initialization on an application program 37 and runs the program 37. The application program 37 is, for example, one downloaded from a web site.

Next, description will be given of operation of the first embodiment configured as described above.

Figure 3A:
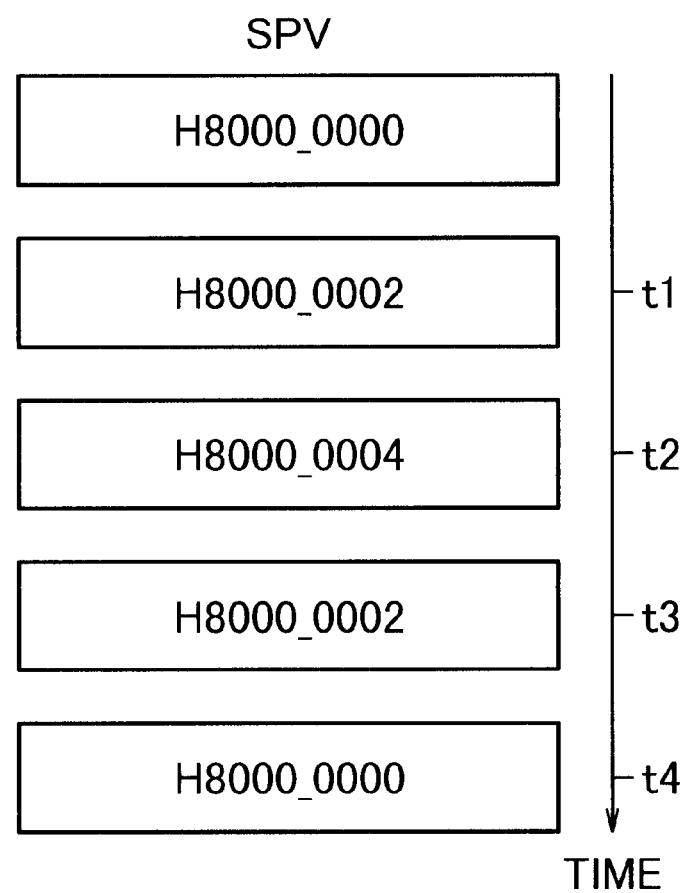
FIG. 3(A) is a diagram showing changes in a stack pointer value SPV.

FIG. 3(A) shows changes in the stack pointer value SPV.

An initial value of the SPV is H8000_0000, wherein a header "H" denotes a hexadecimal number and an under bar a break of 16 bits. The ADR1 is H8000_0004.

For example, when a user operates a key on a portable telephone, and thereby a subroutine call instruction "CALL APSET" is executed on the execution control program 33, the process goes to the application setting routine 36 after, as described above, the contents of the program counter PC and the program status register PS have saved into the stack area 131 and the stack pointer value SPV has changed to H8000_0002. When the subroutine call instruction "CALL APRI" is executed on the application setting routine 36, the process goes to the application program 37 after, as described above, the contents of the program counter PC and the program status register PS have saved into the stack area 131 and the stack pointer value SPV has changed to H8000_0004.

Figure 3B:
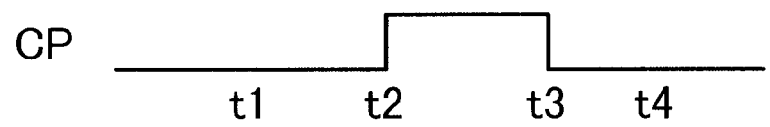
FIG. 3(B) is a time chart showing the output of the comparator in FIG. 1 in relation to FIG. 3(A).

Thereby, the comparison result CP goes high at a time t2 as shown in FIG. 3(B) and the output of the AND gate 16 goes low regardless of a logic level of the write request signal WR. Accordingly, although the contents of the RAM 13 can be rewritten by the application program 37, the contents of the RAM 12 cannot be rewritten by the application program 37. Thereby, it is prevented that data set by the user is rewritten against a user's will by execution of the application program 37.

Before returning to the application setting routine 36 from the application program 37, the contents saved in the stack area 131 are popped into the program status register PS and the program counter PC of the CPU 11, the stack point value SPV changes back to H8000_0002, the comparison result CP transits back to low at a time t3, and the contents of the RAM12 is made rewritable. Following this, an instruction next to "CALL APRI" is executed. Before returning to the execution control program 33, the contents saved in the stack area 131 are popped into the program status register PS and the program counter PC of the CPU 11, the stack point value SPV changes back to H8000_0000. Following this, an instruction next to "CALL ASPSET" is executed.

Second Embodiment

Figure 4:
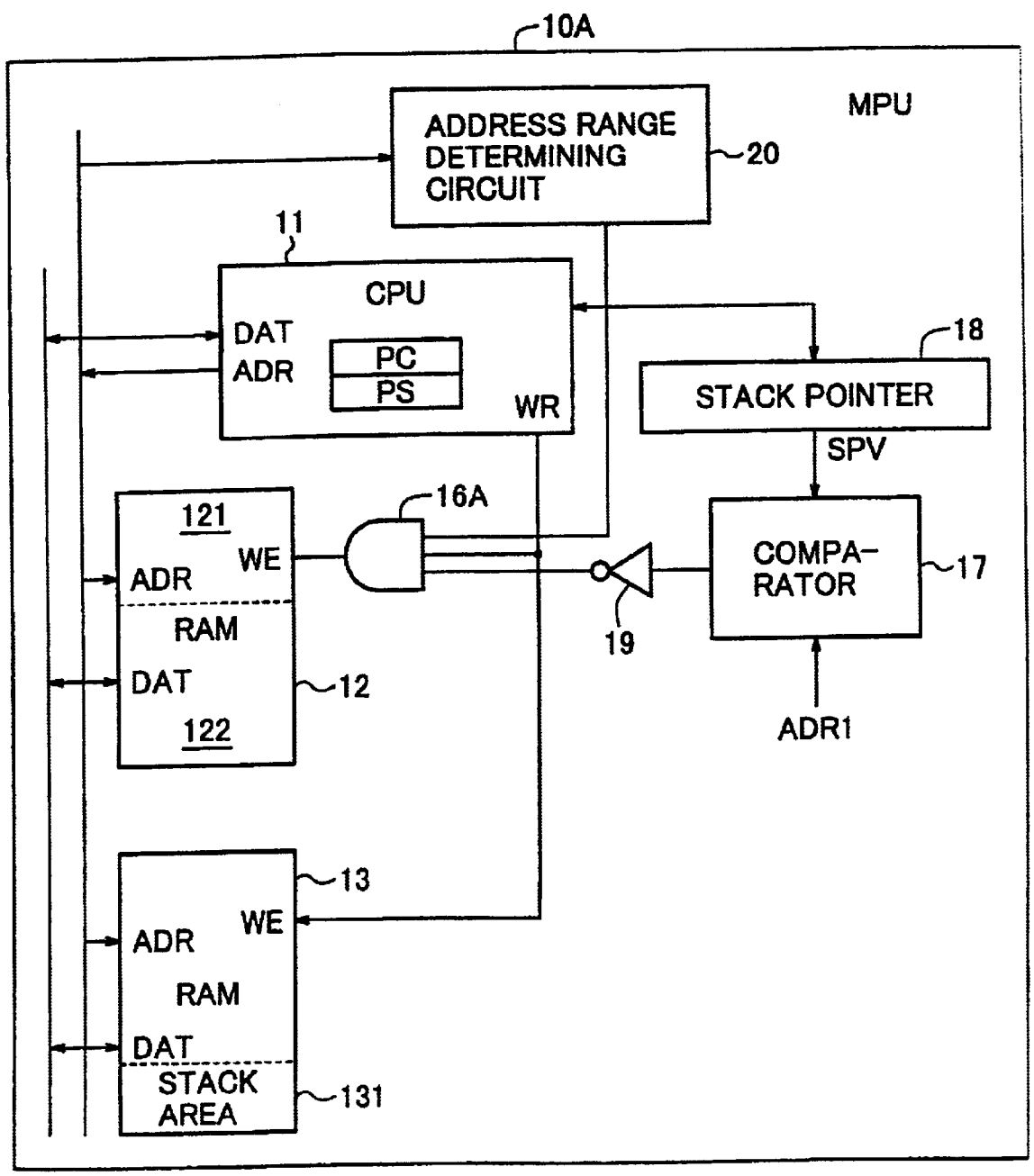
FIG. 4 is a schematic block diagram of a microprocessor of a second embodiment according to the present invention.

FIG. 4 is a schematic block diagram of a microprocessor 10A of a second embodiment according to the present invention.

The RAM 12 consists of an area 121 in which rewriting with an application program is prohibited and an area 122 in which the rewriting is permitted. It is judged by an address range determining circuit 20 whether or not an address ADR falls in the address range of the write protection area 121. When falling in the address range, the output of the address range determining circuit 20 goes high. This output is provided to the AND gate 16A.

The other configuration of the microprocessor 10A is the same as the above-described first embodiment.

According to the second embodiment, when the write protection area 121 is addressed and SPV≧ADR1, writing into the write protection area 121 is prohibited.

Third Embodiment

Figure 5:
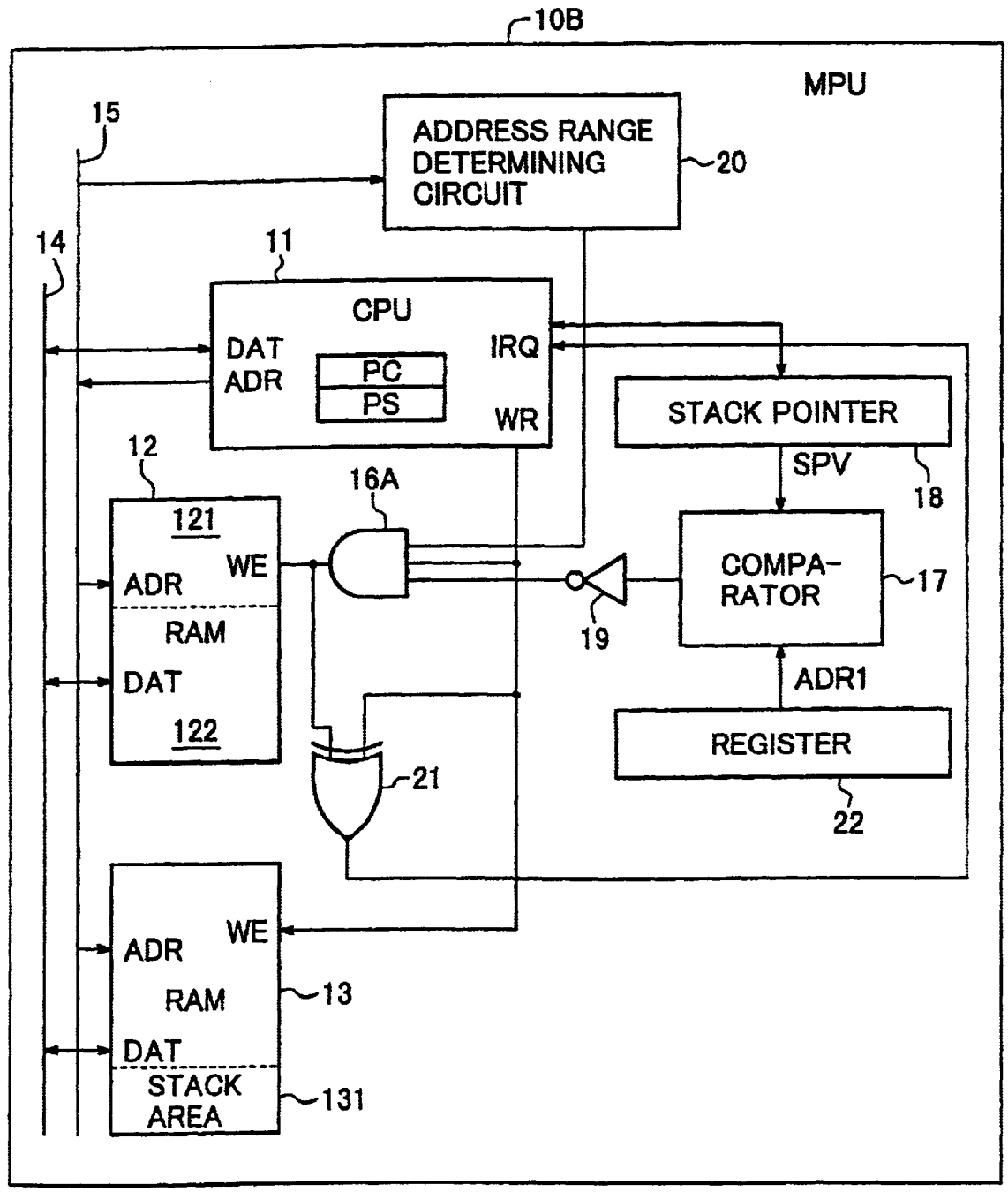
FIG. 5 is a schematic block diagram of a microprocessor of a third embodiment according to the present invention.

FIG. 5 is a schematic block diagram of a microprocessor 10B of a third embodiment according to the present invention.

In this microprocessor 10B, the write request signal output WR of the CPU 11 and the output of an AND gate 16A are connected to the first and second inputs of an exclusive OR gate 21, and the output thereof is connected to an interruption request signal input IRQ of the CPU 11. Further, a register 22 for setting a reference value ADR1 is included in the microprocessor 10B, and by altering the contents of the register 22, the write protection area 121 changes.

The other points are the same as the above-described second embodiment.

When both of the write enable signal inputs WE of the RAMs 12 and 13 are low or high, the interruption request signal IRQ is low. When the write enable signal input WE of the RAM 13 is high while the write enable signal input WE of the RAM 12 is low, the interruption request signal IRQ is high and at its transition, an interruption request is provided to the CPU 11. The CPU 11 responds to the request and presents, for example, on the display panel of a portable telephone that although writing into the write protection area 121 was intended to be executed with an application program, the writing was unsuccessful, therefore the processing is not normally executed. When a user determines to permit the writing, the user operates a key to alter the contents of the register 22 to, for example, H8000_1000, which makes rewriting possible.

Fourth Embodiment

Figure 6:
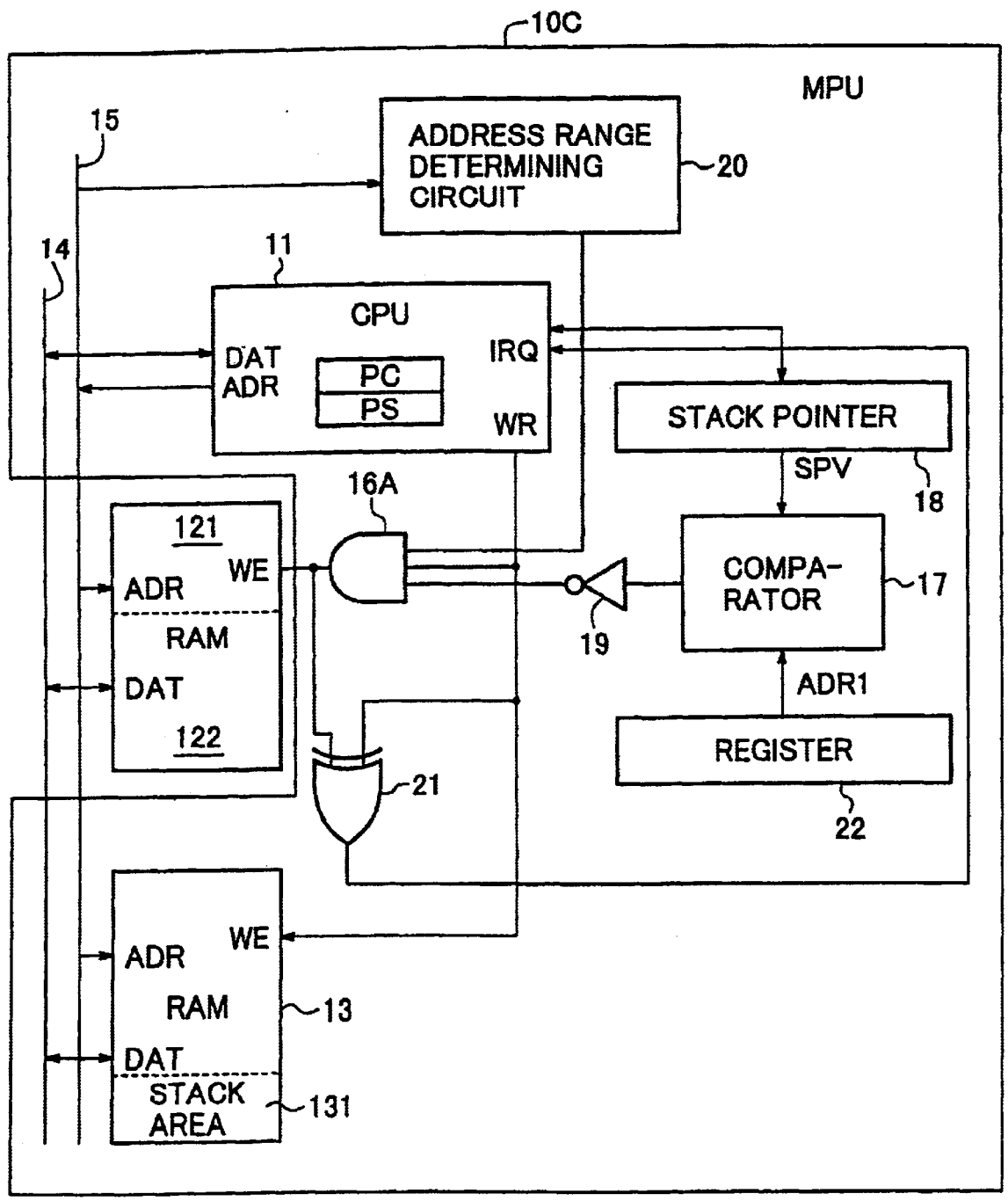
FIG. 6 is a schematic block diagram of a microprocessor of a fourth embodiment according to the present invention.

FIG. 6 is a schematic block diagram of a microprocessor 10C of a fourth embodiment according to the present invention.

In the fourth embodiment, a RAM 12A is externally added to a microprocessor 10C. The other points are the same as the above-described third embodiment.

Although preferred embodiments of the present invention has been described, it is to be understood that the invention is not limited thereto and that various changes and modifications may be made without departing from the spirit and scope of the invention.

What is claimed is:

1. A processor, comprising:
   a first memory section having a stack area and receiving a first signal to enable access to said first memory section;
   a second memory section receiving a second signal to enable access to said second memory section;
   a processing section coupled to said first and second memory sections and having a register;
   a stack pointer specifying an address in said stack area where contents of said register are stored; and an access enable/disable determining circuit comparing contents of said stack pointer with a given value and outputting a comparison result indicative thereof, receiving said first signal, generating said second signal, and making said second signal active according to the comparison result when said first signal is active.

2. The processor of claim 1, wherein said access enable/disable determining circuit makes said second signal inactive when an accessed address of said second memory section is out of a given range.

3. The processor of claim 2, wherein
said second memory section having a write enable input to receive said second signal.

4. The processor of claim 1, wherein said first and second signals are first and second write enable signals, respectively, wherein said access enable/disable determining circuit comprises:
   (i) a comparator comparing the contents of said stack pointer with said given value; and
   (ii) a logic circuit receiving said first signal and said comparison result, making said second signal active according to the comparison result when said first signal is active, and generating said second signal.

5. The processor of claim 4, wherein
said second memory section having a write enable input to receive said second signal.

6. The processor of claim 4, wherein said first second signals are first and second write enable signals, respectively, and said logic circuit makes said second signal active when said first signal is active and when said comparison result indicates that the contents of said stack pointer are larger than said given value.

7. The processor of claim 6, further comprising:
an address range determining circuit providing an address range determining signal indicating whether an accessed address of said second memory falls in a given range,
wherein said logic circuit further receives said address range determining signal, and makes said second signal active when said first signal is active, said address range determining signal indicates that said accessed address falls in said given range, and said comparison result indicates that the contents of said stack pointer is larger than said given value.

8. The processor of claim 6, wherein said processing section is configured by a CPU.

9. The processor of claim 8, wherein said CPU has an interruption request input, and said processor further comprises another logic circuit activating said interruption request input when said second signal is inactive and said first signal is active.

10. The processor of claim 9, further comprising:
a register setting said given value.

11. The processor of claim 1, wherein said first and second signals are first and second read enable signals, respectively, wherein said access enable/disable determining circuit includes:
   (i) a comparator comparing the contents of said stack pointer with said given value; and
   (ii) a logic circuit, receiving said first signal and said comparison result, making said second signal active according to the comparison result when said first signal is active, and generating said second signal.

12. The processor of claim 11, wherein
said second memory section having a write enable input to receive said second signal.

13. The processor of claim 1, wherein
said second memory section having a write enable input to receive said second signal.

* * * * *